(12) United States Patent
Elsherif et al.

(10) Patent No.: US 9,743,258 B1
(45) Date of Patent: Aug. 22, 2017

(54) MULTI-USER MULTIPLE-INPUT MULTIPLE-OUTPUT GROUP MANAGEMENT

(71) Applicant: QUALCOMM Incorporated, San Diego, CA (US)

(72) Inventors: Ahmed Ragab Elsherif, San Jose, CA (US); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/365,751

(22) Filed: Nov. 30, 2016

(51) Int. Cl.
| | | |
|---|---|---|
| *H04B 7/00* | (2006.01) | |
| *H04L 5/00* | (2006.01) | |
| *H04W 4/08* | (2009.01) | |
| *H04B 17/336* | (2015.01) | |
| *H04W 28/14* | (2009.01) | |
| *H04B 7/06* | (2006.01) | |
| *H04W 24/02* | (2009.01) | |
| *H04B 7/0452* | (2017.01) | |
| *H04L 29/08* | (2006.01) | |

(52) U.S. Cl.
CPC ............ *H04W 4/08* (2013.01); *H04B 7/0617* (2013.01); *H04B 17/336* (2015.01); *H04W 24/02* (2013.01); *H04W 28/14* (2013.01); *H04B 7/0452* (2013.01); *H04L 5/0023* (2013.01); *H04L 69/323* (2013.01)

(58) Field of Classification Search
CPC .. H04B 7/0452; H04B 7/0697; H04B 7/0417; H04B 7/0413; H04L 5/0023; H04L 5/006
See application file for complete search history.

(56) References Cited

U.S. PATENT DOCUMENTS

| | | | |
|---|---|---|---|
| 8,320,479 B2 | 11/2012 | Balachandran et al. | |
| 8,599,945 B2 | 12/2013 | Sampath | |
| 9,059,758 B2 | 6/2015 | Hammarwall et al. | |
| 9,209,872 B2 * | 12/2015 | Stacey | H04B 7/0452 |
| 9,379,794 B2 | 6/2016 | Du et al. | |
| 2015/0085761 A1 * | 3/2015 | Maltsev | H04B 7/0617 |
| | | | 370/329 |
| 2016/0088648 A1 | 3/2016 | Xue et al. | |
| 2016/0345343 A1 * | 11/2016 | Elsherif | H04W 72/121 |

* cited by examiner

*Primary Examiner* — Olumide T Ajibade Akonai
(74) *Attorney, Agent, or Firm* — Paradice and Li LLP (57) ABSTRACT

Methods and apparatuses are disclosed for managing multi-user multiple-input multiple-out (MU-MIMO) groups by a wireless device. For at least some embodiments, a wireless communication device may determine a MU-MIMO group by identifying a plurality of MU-MIMO capable stations, determine a plurality of MU-MIMO group candidates from the plurality of MU-MIMO capable STAs based, at least in part, on a predicted data throughput of an MU-MIMO group including at least one of the plurality of MU-MIMO capable STAs, and create a MU-MIMO group from the plurality of MU-MIMO candidates. The predicted data throughput may be based, at least in part, on media access control (MAC) and physical (PHY) layer parameters. In some embodiments, the PHY layer parameters may include historic group size and/or historic multi-user signal-to-interference-plus-noise ratio data.

30 Claims, 7 Drawing Sheets

MULTI-USER MULTIPLE-INPUT MULTIPLE-OUTPUT GROUP MANAGEMENT

TECHNICAL FIELD

The example embodiments relate generally to wireless communications, and specifically to managing multi-user multiple-input multiple-output (MU-MIMO) groups.

BACKGROUND OF RELATED ART

A current area of development in wireless communications systems involves the use of transmitters and receivers having multiple antennas. Generally, these are known as multiple-input multiple-output (MIMO) systems and offer increased peak data rate, spectral efficiency, and quality of service through the use of a plurality of data streams Relative to other wireless technologies, MIMO systems may enable substantial gains in both system capacity and transmission reliability without requiring an increase in frequency spectrum resources. By increasing the number of transmit and receive antennas, the capacity of a MIMO channel may be increased while also reducing the probability of all sub-channels between the transmitter and receiver fading simultaneously.

An access point (AP) may communicate with one or more stations (STAs) simultaneously using a multi-user (MU)-MIMO transmission. The AP may send an MU-MIMO transmission to a group of STAs (e.g., an MU group), in which the STAs are assigned a common group identifier (ID). However, some STAs in the MU group may have little or no traffic to receive at a particular time when an MU-MIMO transmission is scheduled and/or may have transmission characteristics substantially different from other STAs in the MU group. Such a disparity in traffic to be received by STAs in an MU group decreases wireless communication system efficiency and throughput. In addition, some MU-MIMO systems may include a relatively large number of STAs. Traffic disparity, transmission characteristics and large STA numbers may increase the difficulty of forming efficient MU-MIMO groups.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may allow a wireless device to determine a multi-user multiple-input multiple-output (MU-MIMO) group for use in MU-MIMO data transmissions. An example wireless device is disclosed. The wireless device may include a transceiver, one or more processors, and a memory storing instructions that, when executed by the one or more processors, cause the wireless device to identify a plurality of MU-MIMO capable stations (STAs), determine a plurality of MU-MIMO group candidates from the plurality of MU-MIMO capable STAs based, at least in part, on a predicted data throughput of an MU-MIMO group including at least one of the plurality of the MU-MIMO capable STAs, and create an MU-MIMO group from the plurality of MU-MIMO group candidates.

In another example, a method of determining a MU-MIMO group may include identifying a plurality of MU-MIMO capable STAs, determining a plurality of MU-MIMO group candidates from the plurality of MU-MIMO capable STAs based, at least in part, on a predicted data throughput of an MU-MIMO group including at least one of the plurality of the MU-MIMO capable STAs, and creating an MU-MIMO group from the plurality of MU-MIMO group candidates.

In another example, a non-transitory computer-readable storage medium is disclosed. The non-transitory computer-readable storage medium may store one or more programs containing instructions that, when executed by one or more processors of a wireless device, cause the wireless device to: identify a plurality of MU-MIMO capable STAs, determine a plurality of MU-MIMO group candidates from the plurality MU-MIMO capable STAs based, at least in part, on a predicted data throughput of a plurality of an MU-MIMO group including at least one of the plurality of MU-MIMO capable STAs, and create an MU-MIMO group from the plurality of MU-MIMO group candidates.

In another example, a wireless device is disclosed. The wireless device may comprise means for identifying a plurality of MU-MIMO capable STAs, means for determining a plurality of MU-MIMO group candidates from the plurality of MU-MIMO capable STAs based, at least in part, on a predicted data throughput of an MU-MIMO group including at least one the plurality MU-MIMO capable STAs, and means for creating an MU-MIMO group from the plurality of MU-MIMO group candidates.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

The example embodiments are described below in the context of Wi-Fi enabled devices for simplicity only. It is to be understood that the example embodiments are equally applicable for devices using signals of other various wireless standards or protocols. As used herein, the terms "wireless local area network (WLAN)" and "Wi-Fi®" can include communications governed by the IEEE 802.11 standards, BLUETOOTH®, HiperLAN (a set of wireless standards, comparable to the IEEE 802.11 standards, used primarily in Europe), and other technologies used in wireless communications (e.g., ZigBee and WiGig) and/or that implement MU-MIMO. Thus, the terms "WLAN" and "Wi-Fi" may be used interchangeably herein. In addition, although described below in terms of an infrastructure WLAN system including an AP and a plurality of STAs, the example implementations are equally applicable to other WLAN systems including, for example, WLANs including a plurality of APs, peer-to-peer (or Independent Basic Service Set) systems, Wi-Fi Direct systems, and/or Hotspots. In addition, although described herein in terms of exchanging data packets between wireless communications devices, the example implementations may be applied to the exchange of any data unit, packet, and/or frame between wireless communications devices.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

Figure 1:
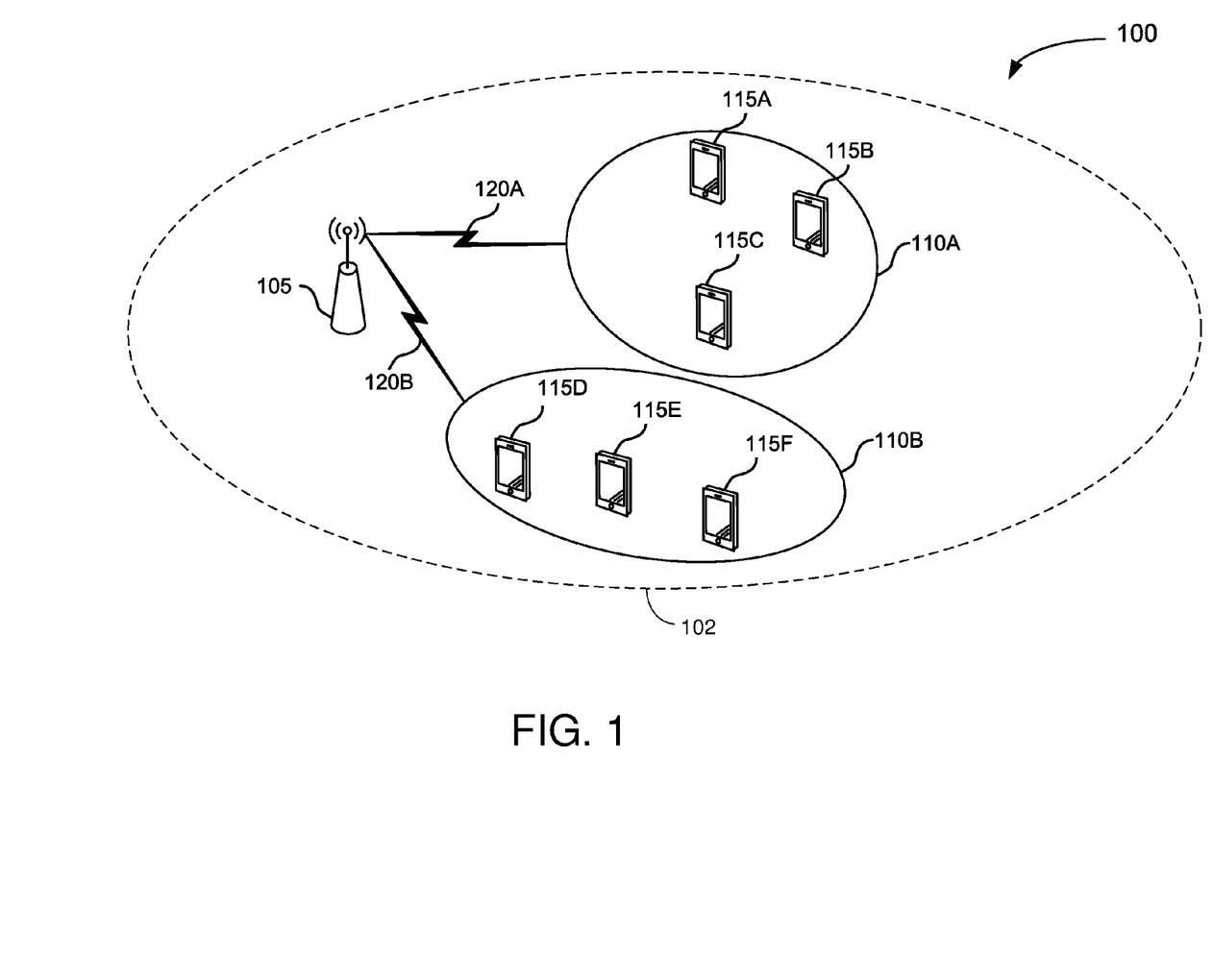
FIG. 1 is an example of a wireless communication system within which example embodiments may be implemented.

FIG. 1 an example of a wireless communication system 100 within which example embodiments may be implemented. Wireless communication system 100 may include one or more wireless communication devices such as an access point (AP) 105 and stations (STAs) 115A-115F. In some embodiments, the AP 105 and the STAs 115A-115F may be any suitable Wi-Fi enabled wireless communication device including, for example, a cell phone, personal digital assistant (PDA), tablet device, laptop computer, or the like. The AP 105 and the STAs 115A-115F may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some embodiments, the AP 105 and/or the STAs 115A-115F may include one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 3-5. Although only one AP 105 and six STAs 115A-115F are shown for simplicity, in other embodiments, the wireless communications system 100 may include other numbers of APs and/or STAs. The AP 105 and the STAs 115A-115F may be members of a network 102, and the AP 105 may transmit to and/or receive data transmissions from one or more of the STAs 115A-115F.

The AP 105 may form one or more multi-user (MU) groups within the network 102. An MU group may be a subset of available multi-user multiple-input multiple-output (MU-MIMO) capable STAs. By way of example, the AP 105 may select STAs 115A-115C to be included within MU group 110A based, at least in part, on an associated predicted data throughput. In some aspects, the predicted data throughput may be based on media access control (MAC) layer and physical (PHY) layer parameters. In another example, the AP 105 may select STAs 115D-115F to be included within MU group 110B. After forming the MU groups 110A and 110B, the AP 105 may schedule and transmit one or more MU-MIMO data transmissions through wireless links 120A and/or 120B, respectively.

Although only two MU groups 110A and 110B are shown for simplicity, in other embodiments, the network 102 may include other numbers of MU groups. In a similar manner, although MU groups 110A and 110B each include three STAs, in other embodiments, MU groups 110A and 110B may include other numbers of STAs.

Figure 2:
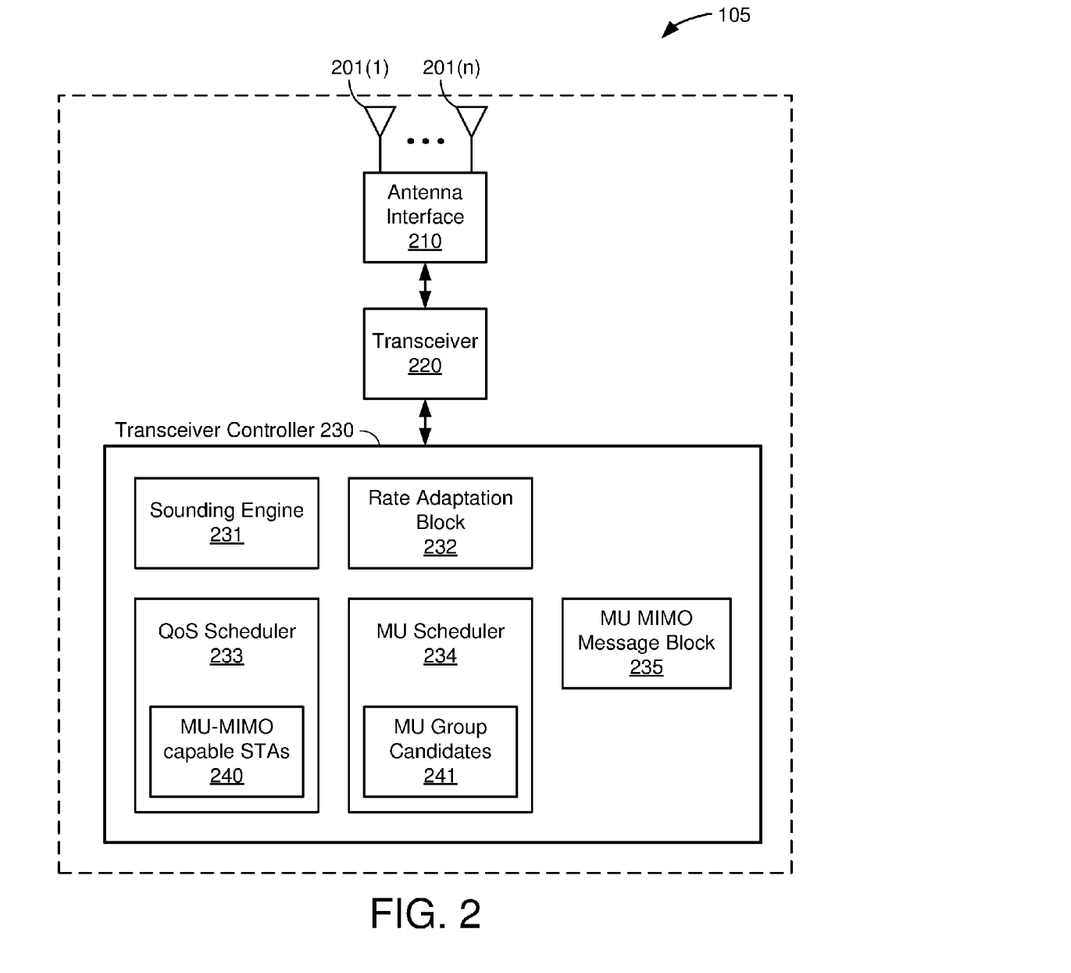
FIG. 2 shows a block diagram of an embodiment of the access point illustrated in FIG. 1.

FIG. 2 shows a block diagram of an embodiment of the AP 105 of FIG. 1. The AP 105 may include antennas 201(1)-201(n), an antenna interface 210, a transceiver 220, and a transceiver controller 230. The transceiver 220 may include one or more receive chains (not shown for simplicity) to receive data transmissions including, for example, single user (SU) and MU-MIMO data transmissions through antennas 201(1)-201(n) and the antenna interface 210. In addition, the transceiver 220 may also include one or more transmit chains (not shown for simplicity) to transmit data transmissions including, for example, SU and MU-MIMO data transmissions through antenna interface 210 and antennas 201(1)-201(n).

The transceiver controller 230 may control transmit and receive operations of transceiver 220 and may include a sounding engine 231, a rate adaptation block 232, a quality of service (QoS) scheduler 233, an MU scheduler 234, and an MU-MIMO message block 235. The transceiver controller 230 may be implemented fully in hardware, software or a combination of hardware and software.

The sounding engine 231 may determine one or more beamforming parameters associated with the STAs included within the network 102 of FIG. 1. For example, the sounding engine 231 may direct the transceiver 220 to transmit a sounding packet to one or more STAs and/or process one or more compressed beamforming (CBF) matrices received in response from the one or more STAs. In addition, the sounding engine 231 may determine one or more beamforming parameters that can be used to configure the AP 105 to transmit a beamformed data transmission to the one or more STAs.

The rate adaptation block 232 may determine a data transmission rate (such as, for example, a modulation coding scheme (MCS) index and/or a number of spatial streams (Nss)) that may be associated with data transmissions to a STA. In some aspects, the rate adaptation block 232 may react to changing channel conditions and increase or decrease data transmission rates accordingly. For example, some STAs may support relatively high data transmission rates because of channel conditions, relative closeness between transmitter and receiver, and/or other factors that may cause a relatively high signal strength and/or signal quality. In contrast, other STAs may support relatively low data transmission rates because of localized interference, relative distance between the transmitter and receiver, and/or other factors that may cause a relatively low signal strength and/or signal quality.

The QoS scheduler 233 may determine and/or identify a first plurality of MU-MIMO capable STAs 240 based, at least in part, on STAs that are available to (within communication range of) the AP 105. In some embodiments, the QoS scheduler 233 may determine a data queue depth associated with each STA. STAs with relatively more queued data than their peer STAs in the network may be better candidates than those peer STAs for inclusion within an MU group. Alternatively, or in addition, the QoS scheduler 233 may determine a data transmission rate (e.g., MCS index and/or Nss) associated with each STA. STAs with relatively higher and/or similar data transmission rates than their peer STAs in the network may be better MU group candidates than those peer STAs. The QoS scheduler 233 may provide the first plurality of MU-MIMO capable STAs 240 to the MU scheduler 234.

The MU scheduler 234 may receive the first plurality of MU-MIMO capable STAs 240 and, in response, generate a second plurality of MU-MIMO group candidates 241. In some aspects, the MU scheduler 234 may determine and/or identify the second plurality of MU-MIMO group candidates 241 based, at least in part, on a predicted data throughput associated with one or more possible MU groups. In some embodiments, the predicted data throughput may be determined based, at least in part, on MAC layer parameters and/or PHY layer parameters. The MAC layer parameters may include data queue depth and/or data transmission rate. The PHY layer parameters may include historic (e.g., previous) group sizes and/or a historic (e.g., previous) MU signal-to-interference-plus-noise ratio (SINR) associated with each STA. Historic group size information and historic MU-SINR information may be stored in the MU-MIMO message block 235, the MU scheduler 234, a look-up table, or any other technically feasible block and/or module including a memory or a storage device. In some embodiments, sounding packets may be transmitted to each STA in the second plurality of MU-MIMO group candidates 241 to determine, at least in part, the MU group. The MU-MIMO message block 235 may transmit one or more MU-MIMO data transmissions to the MU group. Operation of the AP 105 and MU scheduler 234 is described in more detail below in conjunction with FIGS. 3-6.

Figure 3A:
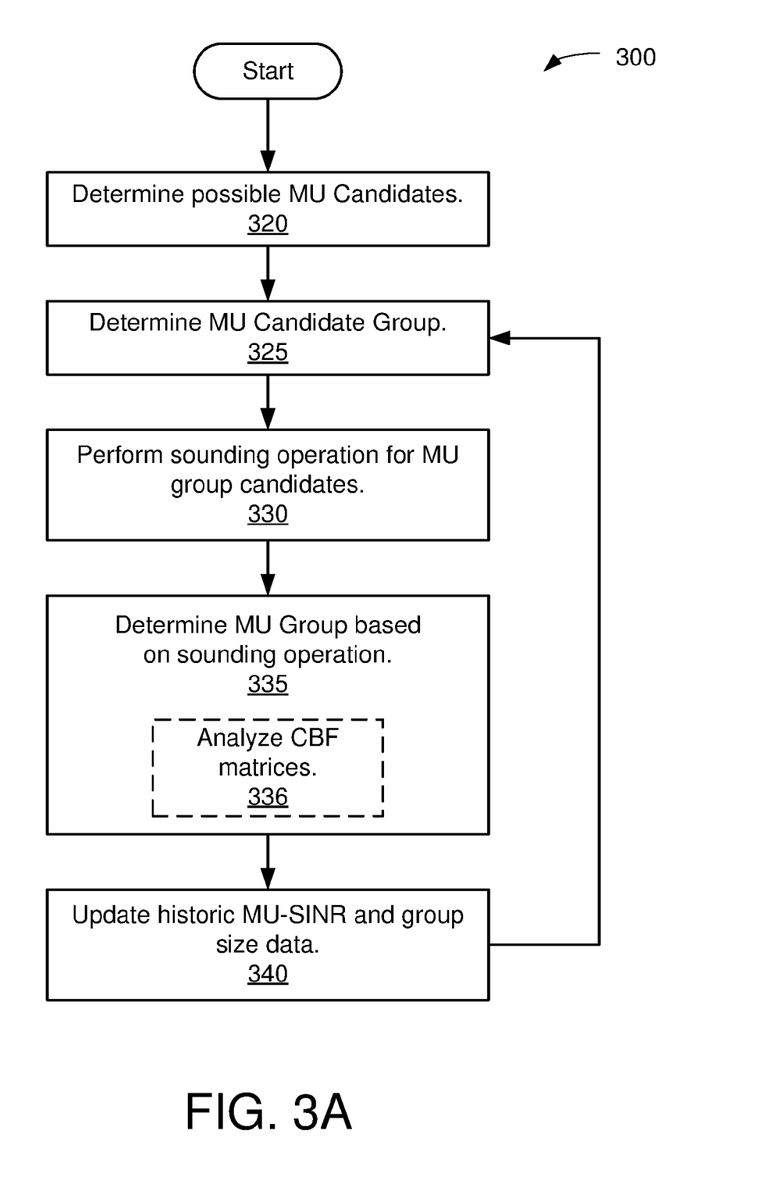
FIG. 3A shows an illustrative flow chart depicting an example operation for determining a multi-user group, in accordance with some embodiments.

FIG. 3A shows an illustrative flow chart depicting an example operation 300 for determining (e.g., by the AP 105) an MU group, in accordance with some embodiments. By way of example, the operation 300 may be performed by the MU scheduler 234 (FIG. 2) of AP 105. Referring also to FIGS. 1 and 2, the AP 105 determines possible MU candidates (320). In some embodiments, the QoS scheduler 233 may determine the first plurality of MU-MIMO capable STAs 240 based on a data queue depth and/or a data transmission rate associated with each STA in the network 102.

Next, the AP 105 determines MU-MIMO group candidates from the MU candidates (325). In some embodiments, the MU scheduler 234 may generate the second plurality MU-MIMO group candidates 241 based, at least in part, on the determined MU candidates and a predicted data throughput of possible MU groups. Predicting the data throughput of possible MU groups is described in more detail below in conjunction with FIGS. 4 and 5. In addition, the predicted data throughput may be based on MAC layer and/or PHY layer (e.g., historic MU-SINR and historic group size) parameters.

Next, the AP 105 performs a sounding operation for the MU-MIMO group candidates (330). For example, the sounding engine 231 may cause the transceiver 220 to transmit a sounding packet to each MU group candidate in the second plurality of MU-MIMO group candidates 241. The sounding engine 231 may receive one or more CBF matrices from the second plurality of MU-MIMO group candidates 241.

Next, the AP 105 determines the MU group based, at least in part, on the results of the sounding operation (335). In some embodiments, the AP 105 may analyze the CBF matrices to determine which MU-MIMO group candidates may be included within the MU group (336). One exemplary procedure to determine the MU group is described in commonly-owned, co-pending U.S. patent application Ser. No. 15/141,380 filed on Apr. 28, 2016 and entitled "MULTI-USER MULTIPLE-INPUT-MULTIPLE-OUTPUT GROUPINGS OF STATIONS", incorporated herein by reference.

Next, the AP 105 updates historic MU-SINR and historic group size data (340). After the MU group is determined in 335, PHY layer parameters associated with the MU groups may be stored and/or updated for later use in 325. Updating historic group size and historic MU-SINR data is described in more detail below in conjunction with FIGS. 4 and 5, respectively.

Figure 3B:
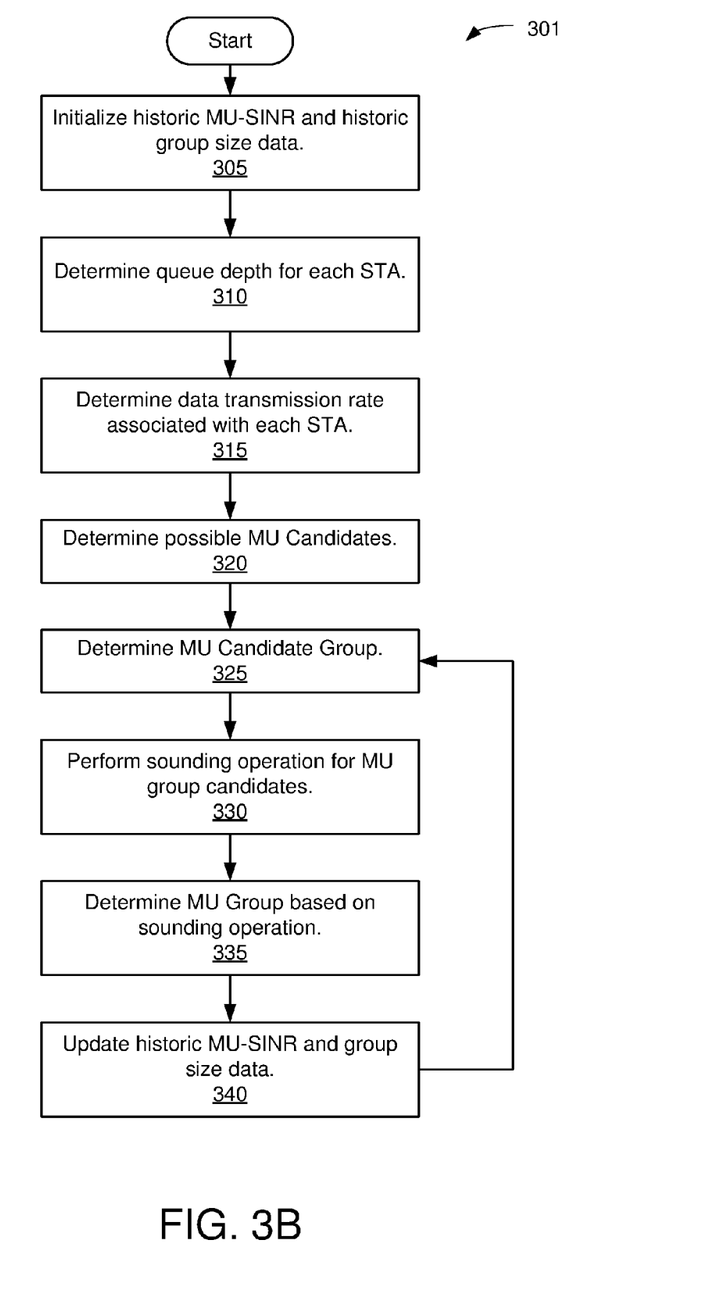
FIG. 3B shows an illustrative flow chart depicting another example operation for determining a multi-user group, in accordance with some embodiments.

FIG. 3B shows an illustrative flow chart depicting another example operation 301 for determining (e.g., by the AP 105) an MU group, in accordance with some embodiments. Operation 301 may include operations described above with respect to FIG. 3A and may include additional and/or optional operations to determine the MU group. The operation begins as the AP 105 initializes historic MU-SINR data and historic group size data (305). In some embodiments, no historic MU-SINR or group size data may be available. Therefore, the AP 105 may initialize the historic MU-SINR data and historic group size data to a predetermined value. For example, historic group size data may be initialized to a value which may be a maximum, predefined, or preferred number of spatial streams, or number of available antennas (or number of antennas to be used for MU-MIMO), or any other technically feasible group size limit. In a similar manner, historic MU-SINR data may be initialized to a typical SINR value, a maximum expected MU-SINR value, or any other technically feasible SINR value.

Next, the AP 105 determines a data queue depth for each STA in the network 102 of FIG. 1 (310). In some embodiments, the data queue depth may be determined based on an amount of data buffered for transmission by the AP 105 to the respective STAs. STAs with relatively large amounts of data to be transmitted as compared to their peer STAs (or alternatively or additionally, to a threshold) may be candidates for MU-MIMO data transmissions. Next, the data transmission rate is determined for each STA in the network 102 (315). For example, the AP 150 may determine a MCS index of a previous data transmission associated with each STA. STAs with similar MCS indices may be candidates for MU-MIMO data transmissions. Next, possible MU candidates are determined (320). Operations 320, 325, 330, 335, and 340 of FIG. 3B may be similar to like numbered operations described above in FIG. 3A.

Figure 4:
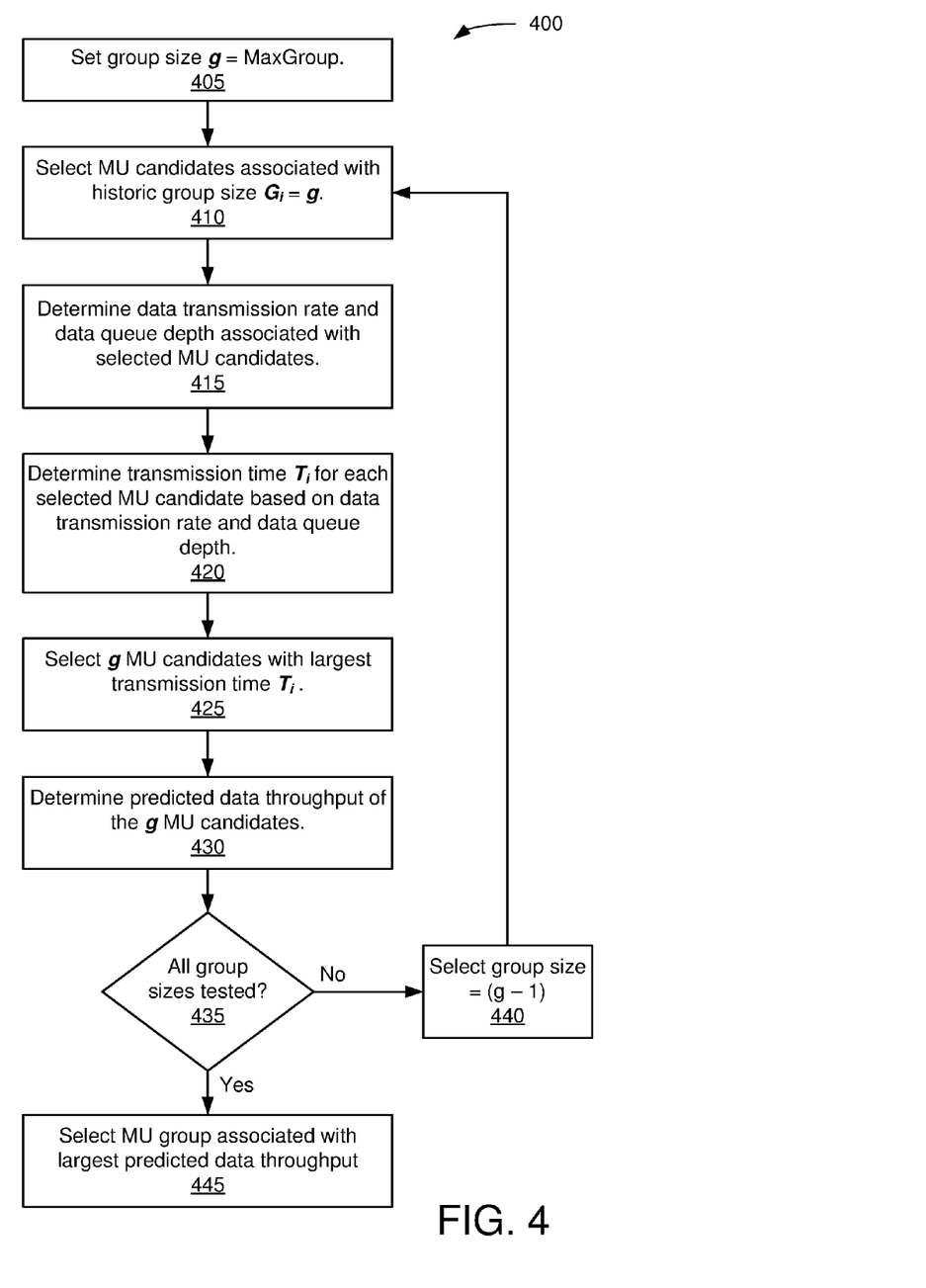
FIG. 4 shows an illustrative flow chart depicting an example operation for determining predicted data throughput of a multi-user group based on historic group size data, in accordance with some embodiments.

FIG. 4 shows an illustrative flow chart depicting an example operation 400 for determining (e.g., by the AP 105) predicted data throughput of an MU group based, at least in part, on historic group size, in accordance with some embodiments. Operation 400 may be an example of the determine MU candidate group operation (325 of FIGS. 3A and 3B) previously described. In some embodiments, the AP 105 (in performing operation 400) may iteratively determine the predicted data throughput of several possible MU groups (including several possible group sizes) formed from STAs in the first plurality of MU-MIMO capable STAs 240. The AP 105 may determine the predicted data throughput of possible MU groups ranging from a maximum group size to a minimum group size. The AP 105 may select the MU group associated with the largest predicted data throughput as a candidate MU group described in the second plurality of MU-MIMO group candidates 241.

Operation 400 begins as the AP 105 sets a group size g to a maximum group size MaxGroup (405), where the group size g may indicate the number of STAs included within an MU group and the MaxGroup value may be an upper limit of the group size g. For example, the MaxGroup value may be associated with the number of antennas 201(1)-201(n) of the AP 105 of FIG. 2. Alternatively, or in addition, the MaxGroup value may be a largest (or otherwise predetermined) number of spatial streams supported by the AP 105 (for example, because of hardware and/or software constraints), or the largest number of spatial streams (Nss) supported by one or more versions of the 802.11 standard. Thus, the group size g may indicate the number of STAs, the number of spatial streams, or a combination of the number of STAs and the number of spatial streams that may be included within the MU group.

Next, the AP 105 selects MU candidates (e.g., STAs in the first plurality of MU-MIMO capable STAs 240) associated with a historic group size G equal to the group size g (where G is the historic group size of the i-th MU candidate) (410). Note that since the MU group may include STAs and/or one or more spatial streams associated with STAs, the term "MU candidate" as used herein may generically refer to either a STA, or a spatial stream, or a combination of STAs and spatial streams. In some embodiments, the historic group size a may be the group size of a previous MU group associated with the i-th MU candidate. Alternatively, or in addition, the historic group size a may be a moving or weighted average of a previous historic group size and a recent group size as expressed by equation 1 shown below:

$$G_i = \alpha G_i(t) + (1-\alpha)G_i \quad \text{(eq. 1)}$$

Where: $G_i(t)$ is the instantaneous group size at time t;
$G_i$ is a historic group size; and
$\alpha$ is a weighting coefficient.

In some embodiments, the historic group size $G_i$ associated with the MU candidates may be stored in a look-up table or other suitable memory. Furthermore, the MU candidates may be sorted based on a decreasing historic group size $G_i$ to simplify search and/or computational operations which may follow.

Next, the AP 105 determines a data transmission rate and a data queue depth for the selected MU candidates (415). As described above with respect to FIG. 3, the AP 105 may determine the data transmission rate from an MCS index and/or Nss associated with the selected MU candidates. In some embodiments, the MCS index may be provided by the rate adaptation block 232. The data queue depth may indicate an amount of data buffered for transmission to the selected MU candidates.

Next, the AP 105 determines a transmission time $T_i$ for each (e.g., i-th) selected MU candidate (420). In some aspects, the transmission time $T_i$ may be an amount of time required to transmit the buffered data indicated by the data queue depth at the determined data transmission rate. The transmission time $T_i$ may be expressed by equation 2 shown below:

$$T_i = Q_i/R_i \quad \text{(eq. 2)}$$

Where: $Q_i$ is the queue depth for the i-th MU candidate; and
$R_i$ is the data transmission rate associated with the i-th MU candidate, based on the associated MCS and Nss.

In some embodiments, the transmission time may be limited (capped) to a maximum burst duration such as, for example, 8 milliseconds. Next, the AP 105 selects the g MU candidates with the largest transmission time $T_i$ (425). The number of MU candidates selected at 410 may be greater than the group size g. Selecting g MU candidates with the largest transmission time $T_i$ at 425 may reduce the number of data throughput prediction operations by focusing on the MU candidates with a relatively large amount of pending transmission time.

Next, the AP 105 determines the predicted data throughput for the g selected MU candidates (430). The predicted data throughput may be based on the transmission time $T_i$, a predicted transmission rate $R_i$, a packet error rate (PER), a predicted total transmit time T*, and an overhead time $OH_g$. The AP 105 may determine the predicted data throughput for a plurality of possible MU groups (composed of the selected MU candidates) having a group size g. In addition, the selected MU candidates may be partitioned into two or more (S) subgroups, each subgroup including $U_s$ MU candidates.

The subgroups may be determined based on a MU candidate transmission time $T_i$ and a data unit transmission time. As described above, the transmission time $T_i$ may be based on queued data associated with the MU candidate. The data unit (sometimes referred to as a protocol data unit, or a Physical layer convergence procedure Protocol Data Unit (PPDU)) transmission time may be a fixed time period. Therefore, the number of MU candidates participating in a subgroup may change as queued data is transmitted. For example, a first MU candidate may have a transmission time $T_i$ of 4 ms, a second MU candidate may have a transmission time $T_i$ of 3.5 ms, and a third MU candidate may have a transmission time $T_i$ of 1.5 ms. The data unit transmission time may be 2 ms. Thus, a first subgroup may include all three MU candidates transmitting during a first data unit transmission time. Since the third MU candidate completes data transmission during the first data unit transmission time, the second subgroup may include only the first and the second MU candidates.

In some embodiments, the predicted data throughput for an MU group of size g (e.g., $PDT_g$) may be determined as expressed by equation 3, shown below:

$$PDT_g = \frac{\sum_s \sum_{i \in U_s} T_i^{(s)} R_i^{(g)}(1 - PER_i^{(g)})}{T* + OH_g} \quad \text{(eq. 3)}$$

Where: $PDT_g$ is the predicted data throughput for MU group of size g;
s is the subgroup index;
$U_s$ is a subgroup within the MU candidates;
i is the STA or spatial stream index;
$T_i^{(s)}$ is the predicted transmission time associated with the i-th STA or spatial stream in an MU subgroup index s;
$R_i^{(g)}$ is the predicted data transmission rate associated with the i-th STA or spatial stream in an MU subgroup of size of g;
$PER_i^{(g)}$ is the packet error rate of the i-th STA or spatial stream in an MU group of size g;
T* is the total transmission time associated with MU group of size g; and
$OH_g$ is the overhead time associated with data transmissions for the MU group of size g.

The predicted transmission time $T_i^{(s)}$ may be based, at least in part, on the data queue depth and the data transmission rate associated with the i-th STA or i-th spatial stream. By way of example and not limitation, if there are 5.2 Mbits of data buffered in the data queue and the data transmission rate is 52 Mbits/sec, then the predicted transmission time $T_i^{(s)}$ may be 100 ms. If additional spatial streams are available, then the predicated transmission time $T_i^{(s)}$ may be reduced (e.g., divided) by, at least in part, Nss.

The $PER_i^{(g)}$ may be determined from previous data transmissions. T* may be a total transmission time including, for example, time for preambles and post-ambles. The $OH_g$ overhead time may include time for sending sounding packets and/or time for receiving and processing compressed beamforming matrices. In some aspects, the $OH_g$ overhead time may also include time for sending Block Acknowledgement Request (BAR) frames and/or time for receiving and processing received Block Acknowledgement (BA) frames.

Next, the AP 105 determines if all group sizes have been tested (435). Group sizes may range from MaxGroup to a minimum group size MinGroup. MinGroup may be one, or a minimum group size determined by the AP 105, or a historic minimum group size based on previous transmissions, or any other suitable group size less than MaxGroup. If all group sizes have not been tested, then the AP 105 decrements the group size g by one (440), and the operation proceeds to 410. On the other hand, if all group sizes have been tested, then the AP 105 selects the MU group with the largest predicted data throughput $PDT_g$ (445). In this manner, the AP 105 generates the second plurality of MU-MIMO group candidates 241 with g MU candidates that is received by the sounding engine 231, as described above with respect to FIGS. 2 and 3. The sounding engine 231 may then sound the STAs included in the second plurality of MU-MIMO group candidates 241 to determine the MU group as described in operation 330 and 335 of FIG. 3. The sounding overhead associated with forming MU groups may advantageously be reduced since the sounding of one or more MU candidates, for example MU candidates with relatively low predicted transmission times, may be avoided.

In some aspects, when the AP 105 executes operation 400 as g is set to one, the predicted data throughput may be for a simplified case of one STA and/or spatial stream. Therefore, instead of determining an MU-MIMO group, the AP 105 may determine a SU-MIMO candidate STA.

Note that the AP 105 may include PHY layer parameters in the predicted data throughput calculation through the historic group size guidance in determining MU candidates (operation 410). In a similar manner, the AP 105 may include MAC layer parameters in the predicted data throughput calculation through the data transmission rate and the data queue depth information (operation 415).

In some embodiments, the predicted data throughput may be determined based on historic MU-SINR values, for which some embodiments are described in more detail below in conjunction with FIG. 5.

Figure 5:
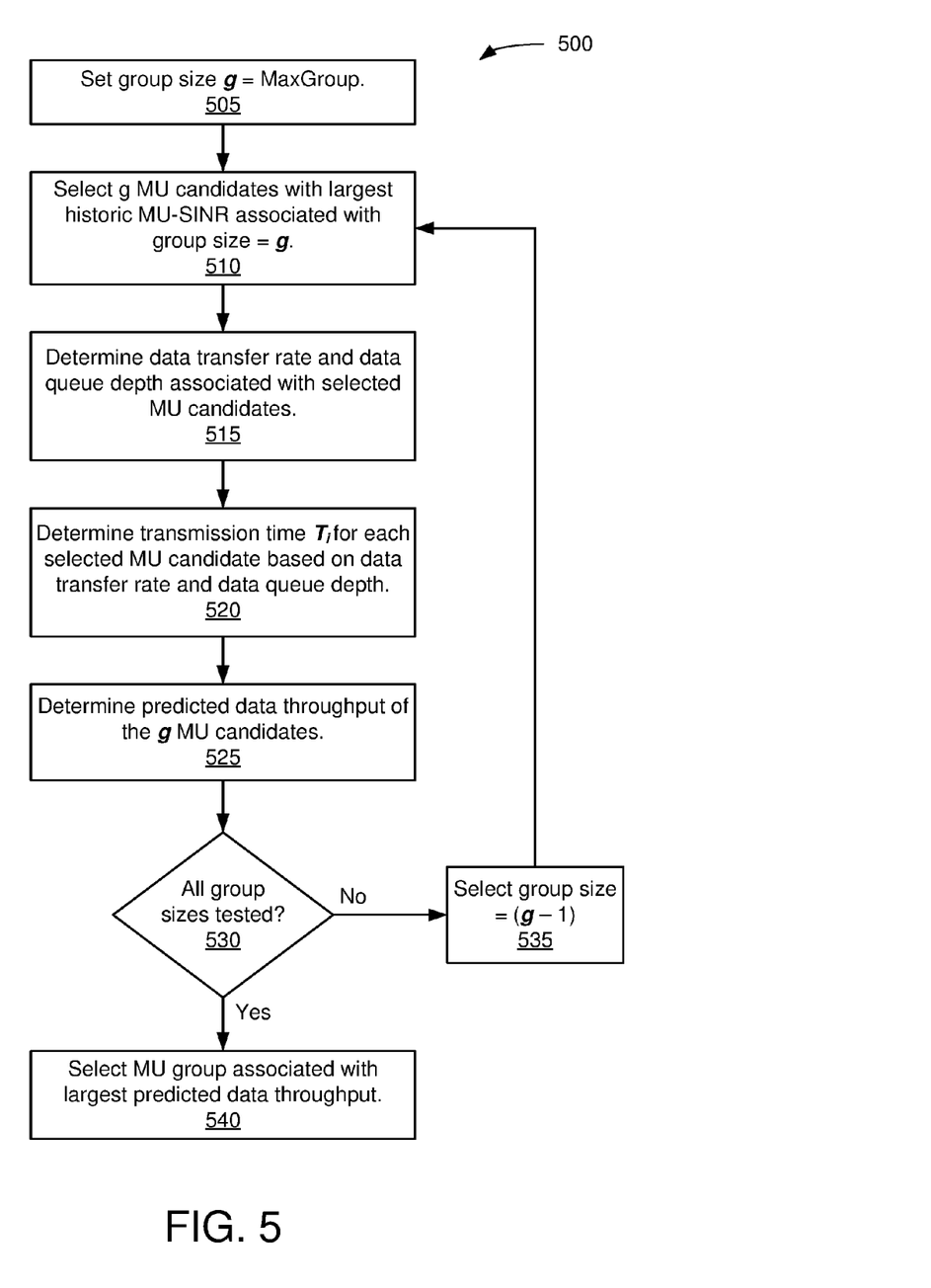
FIG. 5 shows an illustrative flow chart depicting an example operation for determining predicted data throughput of a multi-user group based on historic multi-user signal-to-interference-plus-noise ratio, in accordance with some embodiments.

FIG. 5 shows an illustrative flow chart depicting an example operation 500 for determining predicted data throughput of an MU group based on historic MU-SINR values, in accordance with some embodiments. By way of example, the AP 105 may perform operation 500 as an alternative, or in addition to, operation 400 of FIG. 4. Similar to operation 400, an AP implementing operation 500 may iteratively determine the predicted data throughput of several possible MU groups from STAs in the first plurality of MU-MIMO capable STAs 240.

Operation 500 begins as the AP 105 sets the group size g to the maximum group size MaxGroup (505). The group size g may indicate the number of STAs and/or spatial streams included within an MU group and the MaxGroup value may be an upper limit of the group size g.

Next, the AP 105 selects g MU candidates with a largest historic MU-SINR associated with the group size g (MU- SINR$^{(g)}$) (510). In other words, the AP 105 examines the first plurality of MU-MIMO capable STAs 240, and selects the g MU candidates with the largest historic MU-SINR associated with the MU candidate operating in a group of size g. In some embodiments, the historic MU-SINR values for the i-th MU candidates operating in a group size g may be stored in a look-up table as MU-S/NR$_i^{(g)}$. The historic MU-S/NR$_i^{(g)}$ values may be updated in accordance with a minimum SINR value associated with MU candidates operating in group size g, as expressed by equation 4 below:

$$MU\text{-}SINR_i^{(g)}(t) = \min_{m} MU\text{-}SINR_{i/m}^{(g)} \qquad (\text{eq. 4})$$

Where m is the group index of all groups of size g; and
MU-SINR$_{i/m}^{(g)}$ is the MU-SINR of the i-th MU candidate in a group of size g with group index m.

Alternatively, or in addition, historic MU-SINR information may be based on a moving or weighted average, as expressed by equation 5 below:

$$MU\text{-}SINR_i^{(g)} = \alpha MU\text{-}SINR_i^{(g)}(t) + (1-a)MU\text{-}SINR_i^{(g)} \qquad (\text{eq. 5})$$

Where α is a weighting coefficient.

In some embodiments, after selecting the g MU candidates, the AP 105 may sort the g MU candidates in a decreasing historic MU-SINR$_i^{(g)}$ order.

Next, the AP 105 determines a data transmission rate and a data queue depth associated with the selected MU candidates (515). In some embodiments, the data transmission rate and the data queue depth may be determined in a similar manner as described above with respect to 415 in FIG. 4.

Next, the AP 105 determines the transmission time T$_i$ for each (e.g., i-th) selected MU candidate (520). In some aspects, the transmission time T$_i$ may be an amount of time required to transmit the buffered data indicated by the data queue depth at the determined data transmission rate. In some embodiments, the transmission time may be limited (capped) to a maximum burst duration. The AP 105 may sort the MU candidates in a decreasing transmission time T$_i$ order.

Next, the AP 105 determines the predicted data throughput rate for the g MU candidates (525). In some embodiments, the predicted data throughput rate (PDT$_g$) may be determined as described above in eq. 3. It should be noted that R$_i^{(g)}$ may be determined based on a predicted PHY capacity of an i-th MU candidate in an MU group of size g as BW*log$_2$(1+MU-SINR$_i^{(g)}$)), where BW is the transmission BW of the MU PPDU. Alternatively, or in addition, the R$_i^{(g)}$ may be a PER-based predicted PHY rate of the i-th MU candidate in an MU group of size g.

Next, the AP 105 determines if all group sizes have been tested (530). If all group sizes have not been tested, then the AP 105 decrements the group size g by one (535), and the operation proceeds to 510. On the other hand, if all group sizes have been tested, then the AP 105 selects the MU group with the largest predicted data throughput (540). In this manner, the AP 105 generates the second plurality of MU-MIMO group candidates 241 that is received by the sounding engine 231, as described above with respect to FIGS. 2 and 3. The sounding engine 231 may then sound the STAs included in the second plurality of MU-MIMO group candidates 241 to determine the MU group as described in operation 330 and 335 of FIG. 3.

Note that the AP 105 may include PHY layer parameters in the predicted data throughput calculation through historic MU-SINR values (operation 510). The AP 105 may include MAC layer parameters in the predicted data throughput calculation through the data transmission rate and the data queue depth information (operation 515).

Figure 6:
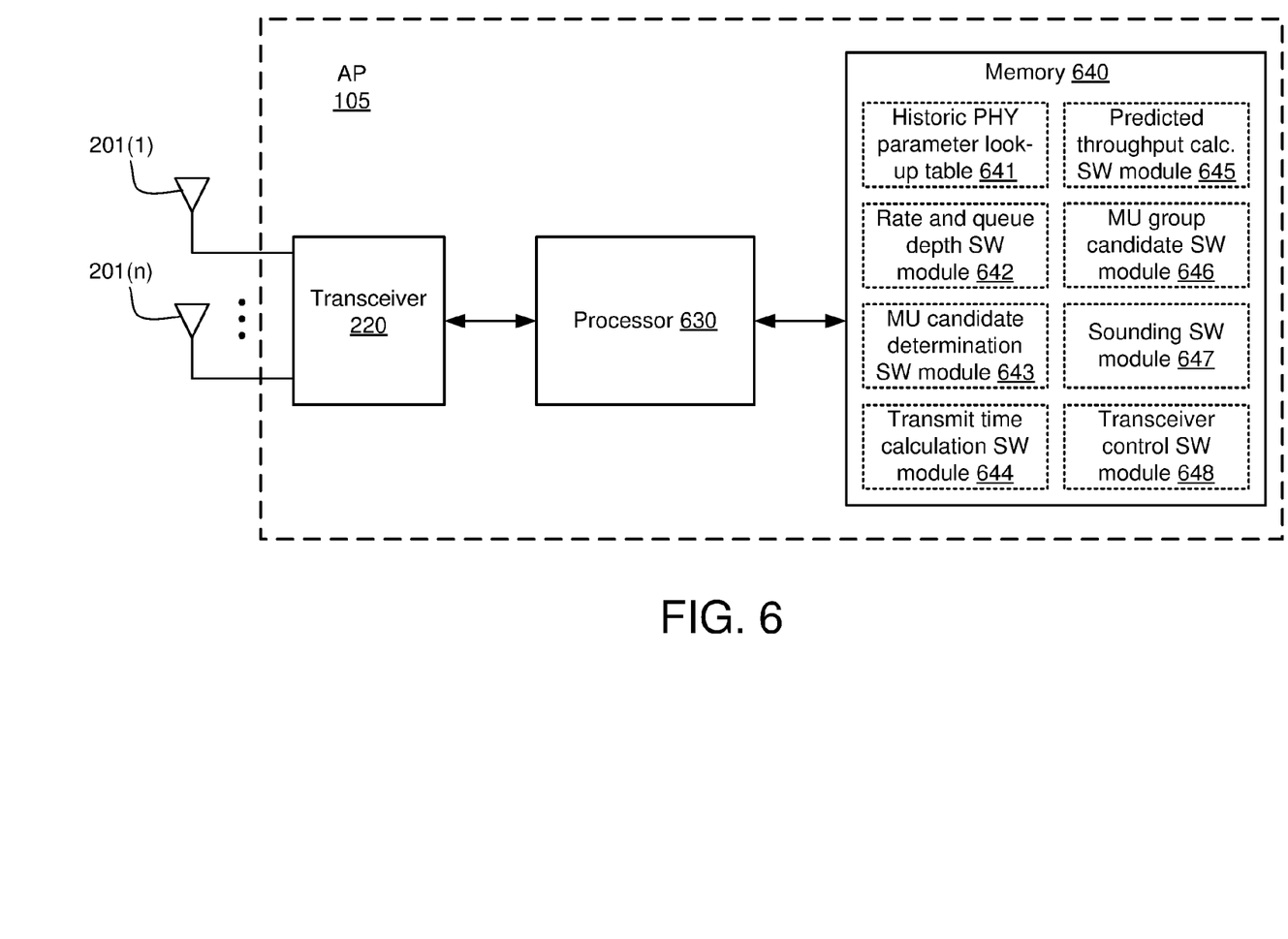
FIG. 6 shows a block diagram of an embodiment of the access point of FIG. 1 and/or FIG. 2.

FIG. 6 shows a block diagram of an embodiment of AP 105 of FIGS. 1 and 2. The AP 105 may include the antennas 201(1)-201(n), the transceiver 220, a processor 630, and a memory 640. The transceiver 220, which may be coupled to the antennas 201(1)-201(n), may transmit signals to and receive signals from other APs and/or STAs. Although not shown for simplicity, the transceiver controller 230 may be implemented within the processor 630 and/or the memory 640 to control transmit and receive operations of the transceiver 220 including, for example, determining MU groups to receive MU-MIMO data transmissions from the AP 105, and transmitting SU-MIMO and/or MU-MIMO data transmissions to one or more MU-MIMO groups.

The processor 630, which is also coupled to the transceiver 220 and the memory 640, may be any one or more suitable processors capable of executing scripts or instructions of one or more software programs stored in the AP 105 (such as within memory 640).

Memory 640 may include a historic PHY parameter look-up table 641 that may be used as a local cache to store historic PHY parameters associated with one or more STAs. For example, the historic PHY parameter look-up table 641 may store historic SINR values (MU-SINR$_i^{(g)}$) associated with previous data transmissions with respect to group size g. Alternatively, or in addition, the historic PHY parameter look-up table 641 may store historic MU group sizes associated with one or more STAs (G$_i$).

Further, memory 640 may also include a non-transitory computer-readable storage medium (e.g., one or more non-volatile memory elements, such as EPROM, EEPROM, Flash memory, a hard drive, etc.) that may store the following software modules:

- a rate and queue depth software (SW) module 642 to determine data transmission rates and/or data queue depths associated with one or more STAs;
- an MU candidate determination SW module 643 to determine which STAs may be MU candidates for participating in MU-MIMO communications;
- a transmit time calculation SW module 644 to determine total transmit time to transmit data associated with one or more MU candidates;
- a predicted throughput calculation SW module 645 to determine predicted data throughput associated with one or more MU groups;
- an MU group candidate determination SW module 646 to determine members of one or more MU groups;
- a sounding SW module 647 to send sounding packets and determine channel conditions with respect to one or more STAs; and
- a transceiver control SW module 648 to control the transceiver 220.

Each software module includes program instructions that, when executed by the processor 630, may cause the AP 105 to perform the corresponding function(s). Thus, the non-transitory computer-readable storage medium of memory 640 may include instructions for performing all or a portion of the operations of FIGS. 3-5.

Processor 630, which is coupled to the transceiver 220, and the memory 640, may be any one or more suitable processors capable of executing scripts or instructions of one or more software programs stored in the AP 105 (e.g., within the memory 640).

Processor 630 may execute the rate and queue depth SW module 642 to determine a data queue depth (e.g., an amount of buffered data pending a transmission) and/or a data transmission rate associated with one or more STAs. The data transmission rate may be expressed by, or associated with, an MCS index. In some embodiments, executing the rate and queue depth SW module 642 may determine a PER-based PHY rate of an i-th STA operating in an MU group of size g (e.g., $R_i^{(g)}$ as described above with respect to FIGS. 4 and 5).

Processor 630 may execute the MU candidate determination SW module 643 to determine and/or identify the first plurality of MU-MIMO capable STAs 240. In some embodiments, the MU candidates included in the first plurality of MU-MIMO capable STAs 240 may be selected based on a data queue depth and a data transmission rate provided by the rate and queue depth SW module 642. The processor 630 may execute the MU candidate determination SW module 643 to provide some or all of the functionality of the QoS scheduler 233.

Processor 630 may execute the transmit time calculation SW module 644 to determine a transmit time associated with one or more STAs. In some embodiments, transmit time may be determined in accordance with a data transmission rate and a data queue depth provided by the rate and queue depth SW module 642.

Processor 630 may execute the predicted throughput calculation SW module 645 to determine a predicted data throughput for one or more MU groups formed from the STAs included in the first plurality of MU-MIMO capable STAs 240. In some embodiments, execution of the predicted throughput calculation SW module 645 may determine predicted data throughput based on data transmission rate, data queue depth, and/or transmit time information. Alternatively, or in addition, the predicted data throughput may be determined based on one or more historic PHY parameters associated with one or more STAs.

Processor 630 may execute the MU group candidate determination SW module 646 to determine and/or identify the second plurality of MU-MIMO group candidates 241. The second plurality of MU-MIMO group candidates 241 may be based on the predicted data throughput of one or more MU groups determined by the predicted throughput calculation SW module 645. The processor 630 may execute transmit time calculation SW module 644, the predicted throughput calculation SW module 645, and/or the MU group candidate determination SW module 646 to provide some or all of the functionality of the MU scheduler 234.

Processor 630 may execute the sounding SW module 647 to determine channel information and/or conditions associated with one or more STAs prior to forming an MU group. In some embodiments, execution of the sounding SW module 647 may cause the transmission of one or more sounding packets by the transceiver 220. Alternatively, or in addition, execution of the sounding SW module 647 may cause the analysis of one or more CBF matrices received from one or more STAs to determine beamforming parameters and/or settings for MU-MIMO data transmissions. In some embodiments, data from the sounding SW module 647 may be used to select MU candidates for an MU group from the second plurality of MU-MIMO group candidates 241. The processor 630 may execute the sounding SW module 647 to provide some or all of the functionality of the sounding engine 231.

Processor 630 may execute the transceiver control SW module 648 to control wireless transmissions and/or receptions through the transceiver 220. In some aspects, the transceiver control SW module 648 may be executed by the processor 630 to select and/or change wireless channels, and/or transmit MU-MIMO data transmissions to one or more MU groups. The processor 630 may execute the transceiver control SW module 648 to provide some or all of the functionality of the transceiver controller 230.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A wireless communications device, comprising:
   a transceiver;
   one or more processors; and
   a memory storing instructions that, when executed by the one or more processors, cause the wireless communication device to:
   identify a plurality of MU-MIMO capable stations (STAs);
   determine a plurality of MU-MIMO group candidates from the plurality MU-MIMO capable STAs based, at least in part, on a predicted data throughput of an MU-MIMO group including at least one of the plurality of MU-MIMO capable STAs; and
   create an MU-MIMO group from the plurality of MU-MIMO group candidates.

2. The wireless communication device of claim 1, wherein the predicted data throughput is based, at least in part, on media access control (MAC) and physical (PHY) layer parameters associated with MU-MIMO capable STAs.

3. The wireless communication device of claim 2, wherein the PHY layer parameters include at least one of previous group sizes, a weighted average of previous group sizes, previous signal-to-interference-plus-noise ratios, a weighted average of previous signal-to-interference-plus-noise ratios, or a combination thereof.

4. The wireless communications device of claim 1, wherein the predicted data throughput is based, at least in part, on a predicted transmit time associated with the MU-MIMO capable STAs.

5. The wireless communications device of claim 4, wherein the predicted transmit time is based, at least in part, on an amount of buffered data associated with the MU-MIMO capable STAs, a data transmission rate associated with the MU-MIMO capable STAs, or a combination thereof.

6. The wireless communications device of claim 1, wherein execution of the instructions causes the wireless communication device to further
   receive compressed beamforming (CBF) matrices from the MU-MIMO group candidates; and
   determine the MU-MIMO group based, at least in part, on the CBF matrices.

7. The wireless communications device of claim 1, wherein the predicted data throughput is based on at least one from the group consisting of: a predicted transmit time, a predicted transmission rate, and a predicted packet error rate.

8. A method of determining a multi-user multiple-input multiple-output (MU-MIMO) group by an access point of a wireless network, the method comprising:
   identifying a plurality of MU-MIMO capable stations (STAs) in the wireless network;
   determining a plurality of MU-MIMO group candidates from the plurality of MU-MIMO capable STAs based, at least in part, on a predicted data throughput of an MU-MIMO group including at least one of the plurality of MU-MIMO capable STAs; and creating an MU-MIMO group from the plurality of MU-MIMO group candidates.

9. The method of claim 8, wherein the predicted data throughput is based, at least in part, on media access control (MAC) and physical (PHY) layer parameters associated with the MU-MIMO capable STAs.

10. The method of claim 9, wherein the PHY layer parameters include at least one of previous group sizes, a weighted average of previous group sizes, previous signal-to-interference-plus-noise ratios, a weighted average of previous signal-to-interference-plus-noise ratios, or a combination thereof.

11. The method of claim 8, wherein the predicted data throughput is based, at least in part, on a predicted transmit time associated with the MU-MIMO capable STAs.

12. The method of claim 11, wherein the predicted transmit time is based, at least in part, on an amount of buffered data associated with the MU-MIMO capable STAs, a data transmission rate associated with the MU-MIMO capable STAs, or a combination thereof.

13. The method of claim 8, further comprising:
receiving compressed beamforming (CBF) matrices from the plurality of MU-MIMO group candidates, wherein creating the MU-MIMO group is based, at least in part, on the CBF matrices.

14. The method of claim 8, wherein the predicted data throughput is based on at least one from the group consisting of: a predicted transmit time, a predicted transmission rate, and a predicted packet error rate.

15. A non-transitory computer-readable storage medium storing instructions that, when executed by one or more processors of a wireless communications device, cause the wireless communications device to:
identify a plurality of MU-MIMO capable stations (STAs);
determine a plurality of MU-MIMO group candidates from the plurality MU-MIMO capable STAs based, at least in part, on a predicted data throughput of an MU-MIMO group including of at least one of the plurality of MU-MIMO capable STAs; and
create an MU-MIMO group from the plurality of MU-MIMO group candidates.

16. The non-transitory computer-readable storage medium of claim 15, wherein the predicted data throughput is based, at least in part, on media access control (MAC) and physical (PHY) layer parameters.

17. The non-transitory computer-readable storage medium of claim 16 wherein the PHY layer parameters include at least one of previous group sizes, a weighted average of previous group sizes, previous signal-to-interference-plus-noise ratios, a weighted average of previous signal-to-interference-plus-noise ratios, or a combination thereof.

18. The non-transitory computer-readable storage medium of claim 15, wherein the predicted data throughput is based on at least one of previous signal-to-interference-plus-noise ratios associated with the MU-MIMO capable STAs, or a weighted average of previous signal-to-interference-plus-noise ratios associated with the MU-MIMO capable STAs, or a combination thereof.

19. The non-transitory computer-readable storage medium of claim 15, wherein the predicted data throughput is based, at least in part, on a predicted transmit time associated with the MU-MIMO capable STAs.

20. The non-transitory computer-readable storage medium of claim 19, wherein the predicted transmit time is based, at least in part, on an amount of buffered data associated with the MU-MIMO capable STAs, a data transmission rate each associated with the MU-MIMO capable STAs, or a combination thereof.

21. The non-transitory computer-readable storage medium of claim 15, wherein execution of the instructions causes to wireless communication device to further:
receive compressed beamforming (CBF) matrices from the MU-MIMO group candidates; and
determine the MU-MIMO group based, at least in part, on the CBF matrices.

22. The non-transitory computer-readable storage medium of claim 15, wherein the predicted data throughput is based on at least one from the group consisting of a predicted transmit time, a predicted transmission rate, and a predicted packet error rate.

23. A wireless communication device comprising:
means for identifying a plurality of MU-MIMO capable stations;
means for determining a plurality of MU-MIMO group candidates from the plurality of MU-MIMO capable STAs based, at least in part, on a predicted data throughput of an MU-MIMO group including at least one the plurality MU-MIMO capable STAs; and
means for creating an MU-MIMO group from the plurality of MU-MIMO group candidates.

24. The wireless communication device of claim 23, wherein the predicted data throughput is based, at least in part, on media access control (MAC) and physical (PHY) layer parameters associated with the MU-MIMO capable STAs.

25. The wireless communication device of claim 24, wherein the PHY layer parameters include at least one of previous group sizes, a weighted average of previous group sizes, previous signal-to-interference-plus-noise ratios, a weighted average of previous signal-to-interference-plus-noise ratios, or a combination thereof.

26. The wireless communication device of claim 23, wherein the predicted data throughput is based, at least in part, on a predicted transmit time associated with the MU-MIMO capable STAs.

27. The wireless communication device of claim 26, wherein the predicted transmit time is based, at least in part, on an amount of buffered data associated with the MU-MIMO capable STAs, a data transmission rate associated with the MU-MIMO capable STAs, or a combination thereof.

28. The wireless communication device of claim 27, wherein the predicted data throughput is based, at least in part, on a product of a predicted transmit time, a predicted transmission rate, and a predicted packet error rate.

29. The wireless communication device of claim 23, further comprising:
means for receiving compressed beamforming (CBF) matrices from the plurality of MU-MIMO group candidates, wherein creating the MU-MIMO group is based, at least in part, on the CBF matrices.

30. The wireless communication device of claim 23, wherein the predicted data throughput is based, at least in part, on at least one from the group consisting of: a predicted transmit time, a predicted transmission rate, and a predicted packet error rate.

* * * * *